United States Patent [19]

Kraus et al.

[11] Patent Number: 4,762,296
[45] Date of Patent: Aug. 9, 1988

[54] MOUNTING DEVICE FOR SUPPORTING TUBING OF DIFFERENT DIAMETERS

[75] Inventors: Willibald Kraus, Grunstadt, Fed. Rep. of Germany; Jean-Luc R. G. Klein, Obermodern, France

[73] Assignee: TRW United-Carr GmbH, Alsenborn, Fed. Rep. of Germany

[21] Appl. No.: 54,374

[22] Filed: May 26, 1987

[30] Foreign Application Priority Data

May 28, 1986 [DE] Fed. Rep. of Germany ....... 3617911

[51] Int. Cl.$^4$ ............................................. F16L 3/12
[52] U.S. Cl. ................. 248/74.2; 248/316.7; 24/543; 24/487
[58] Field of Search .............. 248/74.2, 71, 73, 316.7, 248/316.1, 231.9, 74.4; 24/543, 487, 555

[56] References Cited

U.S. PATENT DOCUMENTS

| | | | |
|---|---|---|---|
| 3,154,281 | 10/1964 | Frank | 248/74.2 X |
| 3,292,223 | 12/1966 | Esposito, Jr. | 24/487 |
| 4,290,575 | 9/1981 | Swartwout | 248/316.7 |
| 4,470,179 | 9/1984 | Gollin et al. | 248/74.2 X |
| 4,566,660 | 1/1986 | Anscher et al. | 248/74.2 |
| 4,679,754 | 7/1987 | Richards | 248/73 X |

FOREIGN PATENT DOCUMENTS

| | | | |
|---|---|---|---|
| 264090 | 8/1968 | Austria | |
| 941104 | 3/1956 | Fed. Rep. of Germany | 248/74.2 |
| 609812 | 3/1976 | Fed. Rep. of Germany | 248/73 |
| 8102462 | 1/1981 | Fed. Rep. of Germany | |
| 3014578 | 11/1981 | Fed. Rep. of Germany | 248/74.2 |
| 3340537 | 5/1985 | Fed. Rep. of Germany | |
| 2439350 | 6/1980 | France | 248/73 |
| 2066887 | 7/1981 | United Kingdom | 248/73 |

Primary Examiner—Ramon S. Britts
Assistant Examiner—Karen J. Chotkowski

[57] ABSTRACT

A mounting device for supporting tubing, flexible piping, ductwork, cables or the like includes a mounting element which carries an upwardly open, U-shaped support member having with a slide-in zone for receiving a tube needing support. Carried by the legs of the U-shaped support member are two dish-like elements. The two dish-like elements are formed independently of each other and are each hingedly connected to the interior side of a separate one of the legs of the U-shaped support member in face-to-face relationship. Each dish-like element carries a resilient arm which extends generally toward the other dish-like element in vertically spaced but overlapping relationship with the other arm. The uppermost resilient arm carries two, spaced resilient fingers which extend upwardly and angularly outward in the slide-in zone. The outer end of the upper resilient arm is arranged to impinge on the top surface of the lower arm when a tube is received on and supported by the upper arm.

9 Claims, 2 Drawing Sheets

MOUNTING DEVICE FOR SUPPORTING TUBING OF DIFFERENT DIAMETERS

BACKGROUND OF THE INVENTION

The subject invention is directed to a mounting device for supporting tubing, flexible piping, ductwork, cables or the like having different diameters. Generally, the device includes a mounting section and a support member which is shaped approximately like a stirrup and defines a slide-in zone for receiving a tube needing support. Approximately equidistant up the legs of the U-shaped support member there are positioned two dish-like elements, which, in the area of the slide-in zone, carry two opposing resilient fingers.

Mounting devices of this general type are known in the prior art. One, a so-called "Yoke-Clip" is shown in the West German Published Application No. 33 40 537 and is designed in such a manner that in the interior of the U-shaped member, there is arranged a dish-like frame. At the exterior side of the frame, vis-a-vis the interior side of the two legs, there are located shoulders which interact with teeth on the interior side of the legs to produce a locking arrangement. At the end of the frame, positioned in the interior of the U-shaped support member in the area of the slide-in zone, there are provided resilient arms. The entire arrangement is designed such that tubing with different diameters can be introduced into the interior of the frame via the slide-in zone. Following insertion, the resilient arms contact the tubing, and, moreover, there takes place a locking action between the shoulders and the teeth. The entire arrangement is expensive to construct and requires for fixation of tubing, two opposing locking arrangement. In addition, the ability of the arrangement to accept tubing, flexible piping, ductwork or cables with different diameters is relatively limited. Moreover, it is impossible to subsequently insert new tubing, flexible piping, ductwork or cables, without disengaging the locking arrangement at the opposing sides of the interior surface of the legs.

Also known in the prior art and shown in Austrian Patent No. 264,090 is a support device which is designed so that within the approximately U-shaped support area there are two arched surfaces which face each other. With this known construction, after a given tube diameter has been inserted, it is extremely difficult to subsequently introduce additional tubes into the interior of the U-shaped support area.

A holding clip made of hard/resilient plastic, is also known in the prior art. This prior clip is made in such fashion that within the U-shaped support area, two short arms are provided which face each other (See West German Patent No. 681 02 462). In this prior device, when a tube is inserted, the two short arms position themselves against the exterior of the tube and thus provide support within the mounting area. This construction is likewise not able to subsequently accept additional tubing.

In view of the above, it is the object of the present invention to provide a mounting device designed in such a manner that highly secure support of tubing, flexible piping, ductwork or cables with different diameters can be achieved and wherein additional tube-shaped elements can subsequently be inserted into the mounting device.

SUMMARY OF THE INVENTION

The above object is achieved according to the invention by having the two dish-like elements designed separately from each other with each element connected with the interior side of opposite legs of the U-shaped support member via a resilient hinged area. Adjacent the resilient hinged areas, each dish-like element carries a resilient arm. The two arms extend generally toward the center of the U-shaped support member and are positioned in vertical spaced, overlapping relationship. On the upper surface of the upper arm there are two, spaced, angularly positioned resilient fingers. A contact edge on the upper arm is arranged to impinge upon the surface of the lower arm when a tube is supported by the fingers. Thus the mounting device is capable of accepting a larger number of tubes with different diameters. As a result of the interaction between the two resilient arms and the resilient fingers, there exists the possibility of being able to subsequently secure additional tube-shaped elements in the mounting device. The design of the two dish elements in the interior of the U-shaped support member guarantees a tight installation situation.

In another design of the invention, the hinged areas can be arranged above the vertical midpoint of each leg of the U-shaped support member. This allows a larger number of tube-shaped elements to be secured within the U-shaped support member.

In another version of the invention, two additional resilient fingers can be provided on the upper ends of the dish-like elements in the slide-in zone. These two additional fingers can be oriented in opposed relationship to the two resilient fingers of the upper arm. The two resilient fingers of the slide-in zone can be placed at a closer distance to each other than the two resilient fingers of the upper arm. As a result of the interaction between these four opposing resilient fingers, in conjunction with the resilient arms, one achieves excellent support of tube-shaped elements with different diameters.

In another version of the invention, the dish elements in the area of the slide-in zone can hook over the frontal surfaces of each leg of the U-shaped support. Due to such overlapaping, the upper part of the U-shaped support area becomes increasingly more restricted after tube installation. Consequently, this impedes inadvertent slipping of a tube-shaped element out of the mounting device.

Pursuant to another characteristic of the invention, the upper side of the lower arm can be provided with several saw-tooth-like recesses, which are arranged to engage against the contact edge of the upper arm. Thus, expediently, there is obtained in only one location, a locking action which adapts to the respective diameter of the tube-shped element being supported.

The mounting element can be arranged on the outside of the U-shaped support member. This mounting element can take many forms, for example, a hook, a bolt-receptacle, or a clip element.

Additionally, the possibility exists to connect two of the U-shaped support devices in axially spaced relationship to one another such as by a common base or mounting element. If a tube component with an enlarged diameter section is installed with the enlarged diameter section located between the two U-shaped support members, then its position is not only protected against lateral removal, but against axial pullout as well.

BRIEF DESCRIPTION OF THE DRAWINGS

The above and other objects and advantages will become apparent from the following description when read in conjunction with the accompanying drawings wherein.

DETAILED DESCRIPTION OF THE PREFERRED EMBODIMENTS

Figure 1:
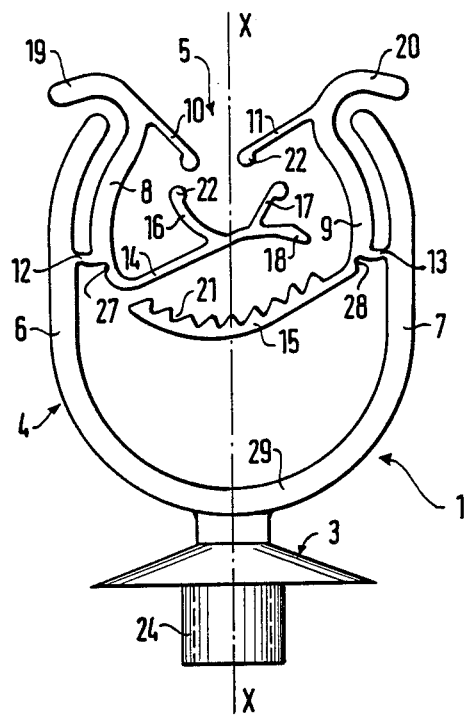
FIG. 1 is a side elevational view of a mounting device formed in accordance with a preferred embodiment of the invention.

Referring more particularly to the drawings wherein the showings are for the purpose of illustrating a preferred embodiment of the invention only, FIG. 1 shows the preferred embodiment of a mounting device formed in accordance with the invention and intended for support of tubing, flexible piping, ductwork, cable or the like. The mounting device shown in FIG. 1 is preferably molded from a suitable plastic and comprises, generally, a mounting element 3 which carries a support section 4. In this embodiment, the support section 4 has a generally U-shaped configuration in the nature of a stirrup and defines a tube receiving or slide-in zone 5.

The U-shaped support section 4 has two upwardly extending, opposing legs 6 and 7. The legs 6 and 7 are integrally joined through the lower or bight area 29. On each of the legs 6 and 7, there are located two dish-shaped elements 8 and 9 which extend upwardly and have generally concave configurations positioned in opposed relationship. At their upper end and generally in the area of the slide-in zone 5, the dish-shaped elements are provided with two inwardly extending resilient fingers 10 and 11. The inner free ends of the resilient fingers 10 and 11 are provided with enlargements 22.

As shown, the two dish-like elements 8 and 9 are designed for movement independent from one another. In particular, each dish-like element 8 or 9 is connectd to the interior of the associated leg by a respective resilient hinge 12, 13. The respective hinges permit the dish-like elements to pivot relative to one another and to their respective supporting legs 6, 7. In this embodiment, the hinged areas 12 and 13 are preferably located slightly above the midpoint of each leg 6 or 7 of the U-shaped support section 4. This leaves a substantial free space available in the lower area of the support section to allow the acceptance of tubing. Closely adjacent the respective hinge areas 12, 13 and carried at the lower end of the respective dish-like elements 8 and 9 are resilient arms 14, 15. As illustrated, the arms 14 and 15 are positioned in vertically spaced relationship and arm 14 overlaps 15 to a significant degree. The upper arm carries on its top surface a pair of upwardly and outwardly extending resilient fingers 16 and 17 each of which have their outer free ends provided with an enlargement 22. The outer free end of upper arm 14 is provided with a contact edge or tip portion 18. For reasons which will be discussed, the lower arm 15 has its upper surface provided with a series of sawtooth-like recesses 21 arranged to receive the tip portion 18 of arm 14.

The upper ends of the dish-like elements 8, 9 preferably have outwardly extending hook-like portions 19 and 20 formed to define the lateral limits of the slide-in zone 5.

Referring again to the resilient fingers 10 and 11 of the slide-in zone 5, it will be noted that they are positioned in generally oppositional orientation relative to the two resilient fingers 16 and 17 of the upper resilient arm 14. The inner ends of the fingers 10 and 11 can be located closer to each other than the ends of the two lower resilient fingers 16 and 17 of upper arm 14. Additionally, it should be appreciated that the four resilient fingers 10, 11 and 16, 17 can be arranged generally symmetrical to the vertical centerline x—x or, alternatively, they can be in somewhat staggered placement relative thereto.

Preferably, and in order to achieve the most desirable functioning of the device, the dish-like elements are relatively thicker and more rigid than the arms 13, 14 and the fingers 10, 11 and 16, 17.

Many different types of mounting elements could be provided for mounting and supporting the support section 4 relative to associated structures. In the embodiment according to FIG. 1, the mounting element 3 is shown as a bolt-receptacle type design having an associated resilient sealing lip portion. Specifically, the mounting element 3 includes a hollow extension 24 having formed internal contours such as threads or the like for allowing it to be attached to a bolt or threaded stud.

Figure 2:
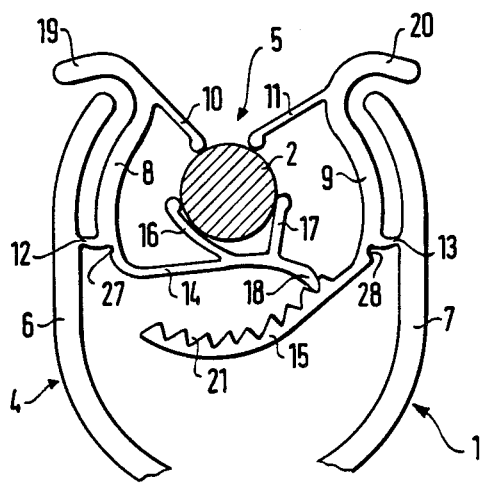
FIG. 2 shows the mounting device of FIG. 1 in a partial view with a tubing inserted in the device.

FIG. 2 shows the embodiment of FIG. 1 holding and supporting a tube-shaped body 2. The tube-shaped body 2 has been previously pressed down into the mounted position shown through the slide-in zone 5. During the installation of the body 2, the upper resilient arm 14 is pressed down causing the contact edge 18 to engage in the sawtooth-like recess of arm 15. This downward movement of the tube and the engagement between the arms 14 and 15 causes inward pivotal movement of the upper ends of the more rigid dish-like elements 8 and 9 and tends to increase the pressure applied by the ends of the upper fingers 10 and 11. This arrangement causes the body 2 to be closely engaged and held by the cooperation of the resilient fingers 10, 11 and 16, 17.

In order to facilitate movement of the arms 14 and 15, additional hinged areas 27 and 28 can be provided at the juncture between the arms 14, 15 and their respective dish-like element 8, 9. It is important, however, that hinged areas 27 and 28 do not be made so flexible as to eliminate the application of pivotal movement to dish-like elements 8, 9.

As is apparent from FIG. 2, as the tube-shaped element is pressed into position in the support section, somewhat of a locking action occurs between the free end 18 of arm 14 and the sawtooth-like configurations or recesses 21 of the arm 15. According to the diameter of the tube-like body 2 which is being supported in the unit, the contact edge 18 engages with different ones of the recesses 21 of the lower arm. As can be appreciated, both the lower arm 15 as well as the upper arm 14 are flexed or bent downwardly around their respective hinge areas 27, 28. Because the hinged areas 12, 13 of the dish-like elements 8 and 9 are positioned above the vertical midpoint of the arms 6 and 7 there is sufficient free space available to allow the device to support tubes with relative large diameters or, a large number of tubes, cables, flexible piping or ductwork.

As the arms 15 and 16 are pressed downwardly with the addition of larger or more tube-like elements, the dish-like elements 8 and 9 are pulled downwardly and generally rotate about their respective hinges 12 and 13. An ultimate limit is established in that hooks 19 and 20 come into contact but, as can be appreciated, the holding forces applied to the tubes located within the device are increased by this rotating action. Consequently, any slipping of tubes out of the mounting device is prevented.

The lower or bight area 29 of the U-shaped support section 4 prevents any opening of the entire mounting device and is designed in such a manner that a tight firm installation is guaranteed. Furthermore, there is the advantage that additional flexible piping ductwork or cables can subsequently be installed in the interior of the U-shaped support area. As a result of the interaction of the four resilient fingers 10, 11, 16 and 17, with the resilient arms 14 and 15, functionally secure support of a large number or wide range of sizes of tubes, lines and the like is assured.

Figure 3:
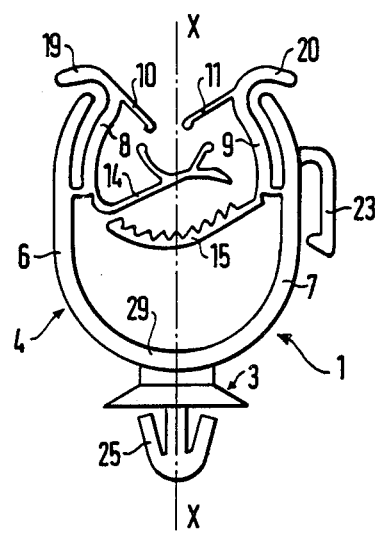
FIG. 3 is a side elevational view of a second embodiment of a mounting device formed in accordance with the invention.

In the embodiment according to FIG. 3, the right leg 7 of the U-shaped support section 4 is provided with a mounting hook 23. Hook 23 can serve for attaching the device to edges of panels, straplike elements, or even inserted in rectangular holes. A clip-like element 25 can also be included and can be provided with a bottom shape to allow it to be received in an extensive range of hole or bore sizes.

Figure 4:
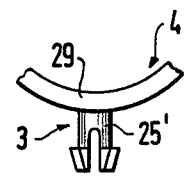
FIG. 4 is a partial elevational view showing a modified form of mounting element for the device; and, FIG. 5 is a pictoral view showing a further embodiment of the device which uses two of the U-shaped support members of the device positioned in spaced axial aligned relationship.

In the version according to FIG. 4, the lower bight areas 29 of the U-shaped support section 4 is provided with a clip element 25' which is also designed to allow mounting in circular holes or bores.

Figure 5:
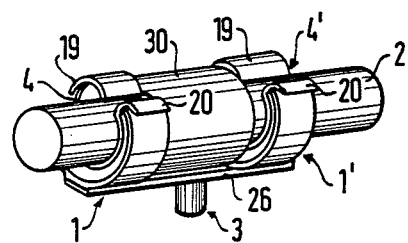

The FIG. 5 modification shows the possibility of providing two of the mounting devices 1 and 1' positioned at an axial distance from each other and connected by a strap or common base member 26. The base or strap 26 can, in turn, be provided with a mounting element 3. In this design, a tube 2 with a large diameter section 3 can be clipped between the two mounting devices 1 and 1' such that the enlarged area 30 is located between the two mounting devices. This prevents axial displacement of the tube.

In summary, the molded plastic mounting device of the invention guarantees secure and trouble-proof support of tubing, flexible piping, ductwork cables or the like of a variety of different diameters. Due to the free space above the bight area 29 of the U-shaped support element, and as a result of the two resilient arms 14, 15 in conjunction with the resilient fingers 10, 11, 16 and 17, excellent support is provided and it is possible to subsequently install additional tubing like elements after some have already been installed.

The invention has been described in great detail to enable one of ordinary skill in the art to make and use the same. Obviously, modifications and alterations of the preferred embodiments will occur to others upon a reading and understanding of the specification and it is our intention to include all such modifications and alterations as part of our invention insofar as they come within the scope of the appended claims.

What is claimed is:

1. A mounting device for supporting and holding tube-like members of different diameters and comprising:
   a generally U-shaped support section having a pair of upwardly extending legs terminating in spaced free ends which define a slide-in zone;
   a pair of dish-like elements mounted generally in said slide-in zone in spaced opposed relationship, each said dish-like element being connected by hinge means to a separate one of said legs for independent pivoting movement relative to each other and said legs,
   a separate, resilient arm carried from the lower portion of each dish-like element and each respective arm having a free end extending in a direction generally toward the opposite dish-like element, the respective arms being located in vertically spaced and overlapping relationship to each other to thereby provide an upper arm and a lower arm;
   a pair of upwardly extending resilient fingers carried on the upper arm;
   the free end of the upper arm having a contact edge adapted to engage and impinge on the upper surface of the lower arm when a tube-like member is supported on said upper arm; and,
   the upper surface of the lower arm including a series of recesses for receiving said contact edge and maintaining said dish-like elements in selected positions of relative adjustment.

2. A mounting device as defined in claim 1 wherein said hinge means connect said dish-like elements to said legs at a location at or above the vertical midpoint of said legs.

3. A mounting device as defined in claim 1 wherein each of the dish-like elements have upper ends and the upper ends of the dish-like elements each carry a resilient finger having a free end which extends generally toward the opposite dish-like element.

4. A mounting device as defined in claim 3 wherein the free ends of the fingers carried on the upper ends of the dish-like elements are located closer together than the free ends of the resilient fingers carried on the upper arm.

5. A mounting device as defined in claim 3 wherein said fingers are located generally symmetrically relative to the vertical centerline of said U-shaped support section.

6. A mounting device as defined in claim 1 wherein the upper ends of the dish-like elements have hook portions which extend laterally outward over the upper ends of the legs of said U-shaped support section.

7. A mounting device as defined in claim 1 wherein the dish-like elements have greater rigidity than said arms.

8. A mounting device as defined in claim 1 including means carried on the exterior of said U-shaped support section for joining said mounting device to associated structure.

9. A mounting device as defined in claim 1 including a base connected to said U-shaped support section and a second U-shaped suport section extending from said base and aligned with said first U-shaped support section.

* * * * *